United States Patent [19]
Law, Jr. et al.

[11] Patent Number: 5,855,748
[45] Date of Patent: Jan. 5, 1999

[54] ELECTROCHEMICAL CELL HAVING A MASS FLOW FIELD MADE OF GLASSY CARBON

[75] Inventors: Clarence Garlan Law, Jr., West Trenton, N.J.; James Arthur Trainham, III, Greenville, Del.; John Scott Newman, Kensington, Calif.

[73] Assignee: E. I. du Pont de Nemours and Company, Wilmington, Del.

[21] Appl. No.: 953,611

[22] Filed: Oct. 17, 1997

Related U.S. Application Data

[63] Continuation of Ser. No. 826,601, Apr. 3, 1997, abandoned, which is a continuation of Ser. No. 431,606, May 1, 1995, abandoned, which is a continuation-in-part of Ser. No. 246,909, May 20, 1994, Pat. No. 5,580,437, and Ser. No. 156,196, Nov. 22, 1993, Pat. No. 5,411,641.

[51] Int. Cl.$^6$ .................................................. C25B 9/00
[52] U.S. Cl. ..................... 204/252; 204/282; 204/283; 204/279
[58] Field of Search ......................... 204/252, 282, 204/283, 279, 290 R, 291, 292; 429/30, 12

[56] References Cited

U.S. PATENT DOCUMENTS

| | | | |
|---|---|---|---|
| 3,453,187 | 7/1969 | Slatin | 204/69 |
| 3,729,395 | 4/1973 | Caron et al. | 204/59 R |
| 3,933,520 | 1/1976 | Gay et al. | 13/6 LF |
| 4,048,394 | 9/1977 | Ludwig | 429/104 |
| 4,110,515 | 8/1978 | Gupta | 429/104 |
| 4,139,447 | 2/1979 | Faron et al. | 204/239 |
| 4,169,025 | 9/1979 | Needes | 204/98 |
| 4,191,618 | 3/1980 | Coker et al. | 204/98 |
| 4,210,501 | 7/1980 | Dempsey et al. | 204/129 |
| 4,214,969 | 7/1980 | Lawrance | 204/255 |
| 4,224,121 | 9/1980 | Dempsey et al. | 204/98 |
| 4,294,671 | 10/1981 | Balko | 204/128 |
| 4,311,568 | 1/1982 | Balko | 204/128 |
| 4,497,882 | 2/1985 | Mikkor | 429/163 |
| 4,595,579 | 6/1986 | Prudhon et al. | 423/487 |
| 4,655,887 | 4/1987 | Oda et al. | 204/98 |
| 4,666,574 | 5/1987 | Oda et al. | 204/98 |
| 4,909,912 | 3/1990 | Oda et al. | 204/98 |
| 4,959,132 | 9/1990 | Fedkiw, Jr. | 204/101 |
| 5,223,102 | 6/1993 | Fedkiw, Jr. et al. | 204/78 |
| 5,298,144 | 3/1994 | Spokane | 204/403 |

FOREIGN PATENT DOCUMENTS

| | | | |
|---|---|---|---|
| 1 179 631 | 12/1984 | Canada | X25B 1/24 |
| 1 195 949 | 10/1985 | Canada | C25B 1/26 |
| 0 319 489 | 6/1989 | European Pat. Off. | |
| 2 445 861 | 8/1980 | France | |
| 2 312 297 | 3/1973 | Germany | C01B 7/00 |
| 55-76573 | 6/1980 | Japan | |
| 56-36873 | 8/1981 | Japan | C25B 11/00 |
| 59-211967 | 11/1984 | Japan | |
| 61-195563 | 8/1986 | Japan | |
| 2-94508 | 4/1990 | Japan | |
| 5-299297 | 11/1993 | Japan | |
| 6-45444 | 6/1994 | Japan | |
| 363424 | 12/1931 | United Kingdom | |
| 861978 | 3/1961 | United Kingdom | |
| 2 083 012 | 3/1982 | United Kingdom | |

OTHER PUBLICATIONS

Jewulski, J. R., et al., Solid–State Proton Conductors—Final Report, For U.S. DOE, Office of Fossil Energy, *Morgantown Energy Tech. Center, Morgantown, WV.*, Institute of Gas Technology, Chicago, Illinois, Dec., 12, 1990.

(List continued on next page.)

*Primary Examiner*—Kathryn L. Gorgos

[57] ABSTRACT

The invention relates to an electrochemical cell which has an electrode, a membrane disposed in contact with one side of the electrode and a mass flow field disposed on the other side of the electrode for directing fluid to and away from the electrode. The mass flow field comprises glassy carbon. The cell of the present invention is particularly useful in converting anhydrous hydrogen halide, in particular, hydrogen fluoride, directly to essentially dry halogen gas, such as anhydrous hydrogen fluoride to fluorine gas.

23 Claims, 2 Drawing Sheets

OTHER PUBLICATIONS

Patent Abstracts of Japan, vol. 007, No. 292, 27 Dec. 1983, JP,A, 58 166659.

Patent Abstracts of Japan, vol. 011, No. 359, 21 Nov. 1987, JP,A,62 133674.

Takenaka, H., et al., Solid Polymer Electrolyte Water Electrolysis, *Int. J. Hydrogen Energy*, 7(5), 397–403, 1982 No month available.

Appleby, A.J. et al., Solid Polymer Acid Electrolytes, *Fuel Cell Handbook*, 10, 286–312, No month available 1989.

Hiroyasu Takenaka et al., High Current Density Operation In Solid Polymer Electrolyte Water Electrolysis, Translation— *Soda Kogyo Gijutsu Toronkai Koentech Yoshishu*, 14, 21–24, 1990, No month available.

Wilson, M.S. et al., High Performance Catalyzed Membranes of Ultra–low Pt Loadings for Polymer Electrolyte Fuel Cells, *J. Electrochem. Soc.*, 2, L–28–L–30, Feb. 1992.

Kirk–Othmer, Bearing Materials to Carbon, *Encyclopedia of Chemical Technology, Fourth Edition*, Vol. 4, John Wiley & Sons, 986–1015, 1992, No month available.

Kirk–Othmer, Alkanolamines to Antibiotics (Glycopeptides), *Encyclopedia of Chemical Technology, Fourth Edition*, Vol. 2, John Wiley & Sons, 190–196, 1992, No month available.

Gerhartz, W., Cancer Chemotherapy to Ceramic Colorants, *Ullmann's Encyclopedia of Industrial Chemistry, Fifth, Completely Revised Edition*, Volume A5, 95–125, 1986, No month available.

Burton, R. A., et al., Vitreous Carbon Matrix for Low–Wear Carbon/Metal Current Collectors, *IEEE Transactions on Components, Hybrids, and Manufacturing Technology*, 12(2), 224–228, Jun. 1989.

ELECTROCHEMICAL CELL HAVING A MASS FLOW FIELD MADE OF GLASSY CARBON

This application is a continuation of U.S. application Ser. No. 08/826,601, filed Apr. 3, 1997, abandoned, which is a continuation of U.S. application Ser. No. 08/431,606, filed May 1, 1995, now abandoned, which is a continuation-in-part of U.S. application Ser. No. 08/246,909 filed May 20, 1994, now U.S. Pat. No. 5,580,437 which was surrendered in favor of U.S. reissue application Ser. No. 09/093,535 filed Jun. 8, 1998, now pending and U.S. Ser. No. 08/156,196 filed Nov. 22, 1993, now U.S. Pat. No. 5,411,641, which was surrendered in favor of U.S. reissue application U.S. Ser. No. 09/093,468 filed Jan. 8, 1998.

BACKGROUND OF THE INVENTION

1. Field of the Invention

The present invention relates to an electrochemical cell having a mass flow field made of vitreous, or glassy carbon. This electrochemical cell is particularly useful in converting anhydrous hydrogen fluoride to dry fluorine gas, although it may also be used in converting other anhydrous halogen halides, in particular, hydrogen chloride, hydrogen bromide and hydrogen iodide, to a dry halogen gas, such as chlorine, bromine, or iodine.

2. Description of the Related Art

It is not possible to make fluorine from aqueous solutions due to thermodynamic considerations. The production of oxygen from water occurs at lower potentials than the production of fluorine. Thus, water reacts to form oxygen prior to the formation of fluorine gas. To produce fluorine, electrolysis in a non-aqueous solution is performed. Pure liquid hydrogen fluoride (HF), as anhydrous HF, does not have any water, and hence, the reaction to produce oxygen is avoided. However, anhydrous HF has very little ability to conduct ions, as evidenced by its very low electrical conductivity. Hence, to increase the conductivity of a charge-carrying solution, potassium fluoride (KF) is added to the melt. Therefore, existing electrochemical cells to make fluorine have a melt (non-aqueous) solution of HF and KF. The KF is present to add conductivity to the solution and prevents the use of excess voltage in an electrochemical cell.

Existing electrochemical cells for fluorine evolution use a carbon anode, from which the fluorine evolves. Hydrogen is evolved from a cathode made of either an alloy of nickel and copper, sold under the trademark MONEL® by International Nickel Co., Inc., or stainless steel. To avoid detonations from the combination of fluorine and hydrogen in the cell, they are separated from each other by a metal shroud which dips down into the melt and hence provides separation the hydrogen and fluorine as they are produced. The cells are initially charged with a HF-KF mixture, then HF is added to the melt to provide for the hydrogen and fluorine that are removed during production. The current density of the reaction in such cells generally ranges between 70–200 mA/cm$^2$. Such cells are generally operated at 60°–110° C.

The fluorine produced by such cells is often used in converting uranium tetrafluoride to uranium hexafluoride. Uranium hexafluoride is used in the gas diffusion process for making nuclear material. However, the price for fluorine can be quite high. Moreover, both hydrogen fluoride and fluorine are extremely corrosive to both the commonly used materials of construction in fluoride production processes, as well as to human skin. Any leakage, even that by slow permeation of such materials of construction, poses severe maintenance cost and personnel safety concerns.

Vitreous, or glassy carbon, has been used for a current collector in a secondary battery. For example, in U.S. Pat. No. 4,048,394 to Ludwig, a secondary battery has a current collector comprising a graphite body having a coating of vitreous carbon. The anode and the cathode are molten reactants. U.S. Pat. No. 4,497,882 to Mikkor discloses a sheet of graphite foil that is coated with an amorphous pyrolytic or glassy carbon to fill any openings in and/or through the graphite foil. A thin layer of aluminum metal is coated onto the graphite foil. The aluminum metal coated side of the graphite foil is bonded to an aluminum surface of an electronically conductive material. However, neither of these patents discloses a mass flow field formed of vitreous or glassy carbon and, in particular, in a cell for making fluorine.

Thus, there exists a need for a less costly fluorine production process which utilizes materials which are able to withstand an attack from corrosive hydrogen fluoride and fluorine.

SUMMARY OF THE INVENTION

The present invention solves the problems of the prior art by allowing for direct processing of anhydrous hydrogen halide which is a by-product of manufacturing processes, without first dissolving the hydrogen halide in water, or as is the case with hydrogen fluoride, processing it from an HF-KF melt. This direct production of essentially dry halogen gas, when done, for example, for fluorine gas, is less capital intensive than processes of the prior art, which require separation of water from the fluorine gas. This direct production of essentially dry fluorine gas also requires lower investment costs than the electrochemical conversions of hydrogen fluoride of the prior art. This advantage can translate directly into lower power costs per pound of say, fluorine, generated than in the aqueous electrochemical processes of the prior art. The direct production of essentially dry fluorine gas also provides a process which produces drier fluorine gas with fewer processing steps as compared to that produced by electrochemical or catalytic systems of the prior art, thereby simplifying processing conditions and reducing capital costs. In addition, the process described herein has the advantage of such higher unit production rates and the use of materials which will allow the containment of noxious gas.

By using a current collector comprising glassy carbon in the electrochemical cell of the present invention, the above-noted advantages are compounded, especially in the production of fluorine. As noted above, both hydrogen fluoride and fluorine are extremely corrosive to both materials of construction, as well as to human skin. Since glassy carbon is much less gas permeable than materials used for current collectors of the prior art, its use in the electrochemical cell of the present invention decreases gas leakage potential and lessens cost and safety concerns. The decrease in gas permeability is extremely dramatic. The gas permeability of glassy carbon is 10 to 12 orders of magnitude lower than the gas permeability of common forms of graphite. This dramatic decrease in gas permeability makes the electrochemical cell and process of the present invention even more practicable and attractive.

To achieve the foregoing solutions, and in accordance with the purposes of the invention as embodied and broadly described herein, there is provided an electrochemical cell for directly producing essentially dry halogen gas from essentially anhydrous hydrogen halide, comprising means for oxidizing molecules of essentially anhydrous hydrogen halide to produce essentially dry halogen gas and protons; cation-transporting means for transporting the protons therethrough, wherein one side of the cation-transporting means is disposed in contact with one side of the oxidizing means; means for reducing the transported protons, wherein the other side of the cation-transporting means is disposed in contact with the reducing means; and a mass flow field disposed on at least one side of the cation-transporting means, wherein the mass flow field comprises glassy carbon.

DESCRIPTION OF THE PREFERRED EMBODIMENTS

Reference will now be made in detail to the present preferred embodiments of the invention as illustrated in the accompanying drawings.

In accordance with a first and second embodiment of the present invention, there is provided an electrochemical cell for the direct production of essentially dry halogen gas from anhydrous hydrogen halide. Such a cell is shown generally at 10 in FIG. 1. The cell of the present invention will be described with respect to a preferred embodiment of the present invention, which directly produces essentially dry fluorine gas from essentially anhydrous hydrogen fluoride. However, this cell may alternatively be used to produce other halogen gases, such as bromine, chlorine and iodine from a respective anhydrous hydrogen halide, such as hydrogen bromide, hydrogen chloride and hydrogen iodide. The term "direct" means that the electrochemical cell obviates the need to remove water from the halogen gas produced or the need to convert essentially anhydrous hydrogen halide to aqueous hydrogen halide before electrochemical treatment. In the first embodiment, fluorine gas, as well as hydrogen, is produced in this cell. In a second embodiment, water, as well as fluorine gas, is produced by this cell, as will be explained more fully below.

Figure 1:
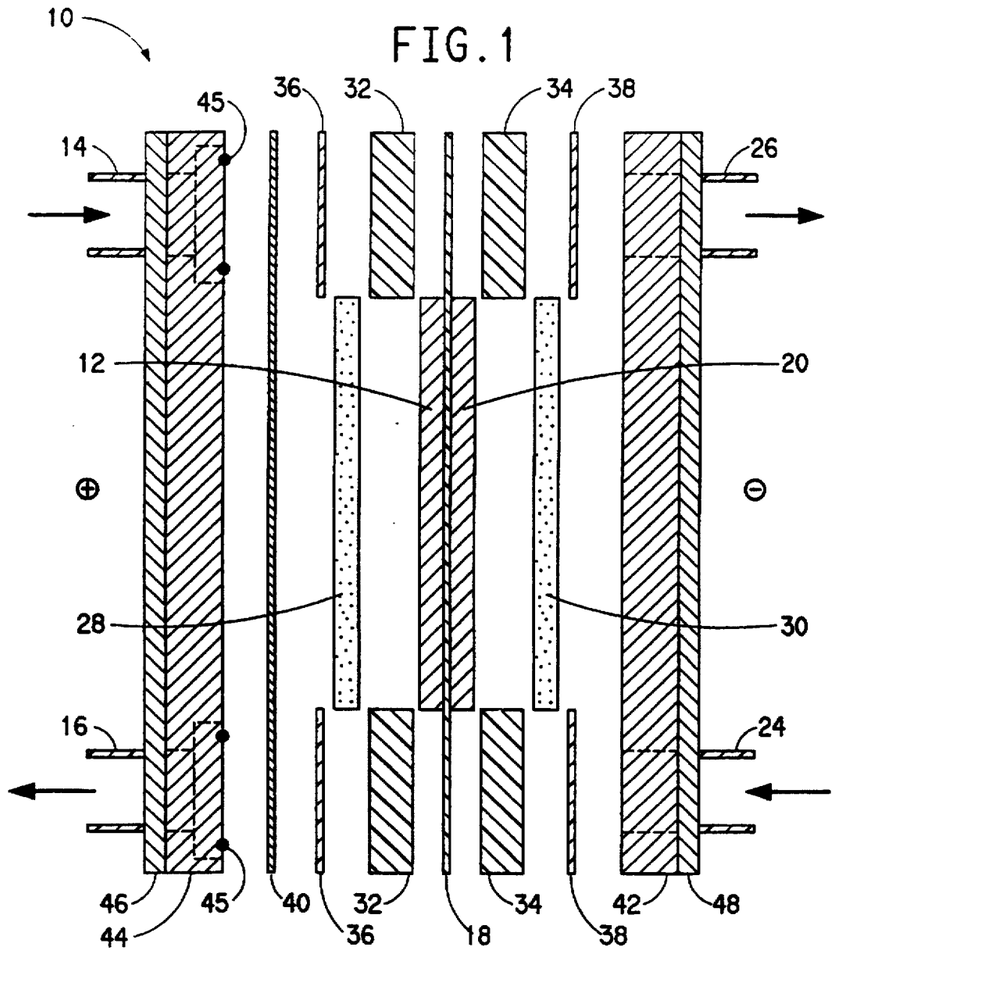
FIG. 1 is an exploded, cross-sectional view of an electrochemical cell for producing halogen gas from anhydrous hydrogen halide according to a first and second embodiment of the present invention.

The electrochemical cell of the first and second embodiments comprises means for oxidizing molecules of essentially anhydrous hydrogen halide to produce essentially dry halogen gas and protons. The oxidizing means is an electrode, or more specifically, an anode 12 as shown in FIG. 1. On the anode side, electrochemical cell 10 has an anode-side inlet 14 and an anode-side outlet 16. Since in the preferred embodiment, anhydrous HF is carried through the inlet, and fluorine gas is carried through the outlet, the inlet and the outlet may be lined with a copolymer of tetrafluoroethylene with (perfluoro)alkyl-vinyl either, sold under the trademark TEFLON® PFA (hereinafter referred to as "PFA", by E. I. du Pont de Nemours and Company of Wilmington, Del. (hereinafter referred to as "DuPont").

The electrochemical cell of the first and second embodiments also comprises cation-transporting means for transporting the protons therethrough, where one side of the oxidizing means is disposed in contact with one side of the cation-transporting means. Preferably, the cation-transporting means is a cation-transporting membrane 18 as shown in FIG. 1. More specifically, membrane 18 may be a proton-conducting membrane. Membrane 18 may be a commercial cationic membrane made of a fluoro- or perfluoropolymer, preferably a copolymer of two or more fluoro or perfluoromonomers, at least one of which has pendant sulfonic acid groups. The presence of carboxylic groups is not desirable, because those groups tend to decrease the conductivity of the membrane when they are protonated. Various suitable resin materials are available commercially or can be made according to patent literature. They include fluorinated polymers with side chains of the type —$CF_2CFRSO_3H$ and —$OCF_2CF_2CF_2SO_3H$, where R is an F, Cl, $CF_2Cl$, or a $C_1$ to $C_{10}$ perfluoroalkyl radical. The membrane resin may be, for example, a copolymer of tetrafluoroethylene with $CF_2$=$CFOCF_2CF(CF_3)$ $OCF_2CF_2SO_3H$. Sometimes those resins may be in the form that has pendant —$SO_2F$ groups, rather than —$SO_3H$ groups. The sulfonyl fluoride groups can be hydrolyzed with potassium hydroxide to —$SO_3K$ groups, which then are exchanged with an acid to —$SO_3H$ groups. Suitable perfluorinated cationic membranes, which are made of hydrated, copolymers of polytetrafluoroethylene and poly-sulfonyl fluoride vinyl ether-containing pendant sulfonic acid groups, are offered by DuPont under the trademark "NAFION" (hereinafter referred to as NAFION®). In particular, NAFION® membranes containing pendant sulfonic acid groups include NAFION® 117, NAFION® 324 and NAFION® 417. The first type of NAFION® is unsupported and has an equivalent weight of 1100 g., equivalent weight being defined as the amount of resin required to neutralize one liter of a 1M sodium hydroxide solution. The other two types of NAFION® are both supported on a fluorocarbon fabric, the equivalent weight of NAFION® 417 also being 1100 g. NAFION® 324 has a two-layer structure, a 125 μm-thick membrane having an equivalent weight of 1100 g., and a 25 μm-thick membrane having an equivalent weight of 1500 g.

Although the present invention describes the use of a solid polymer electrolyte membrane, it is well within the scope of the invention to use other cation-transporting membranes which are not polymeric. For example, proton-conducting ceramics such as beta-alumina may be used. Beta-alumina is a class of nonstoichiometric crystalline compounds having the general structure $Na_2O_x.Al_2O_3$, in which x ranges from 5 (β"-alumina) to 11 (β-alumina). This material and a number of solid electrolytes which are useful for the invention are described in the *Fuel Cell Handbook*, A. J. Appleby and F. R. Foulkes, Van Nostrand Reinhold, N.Y., 1989, pages 308–312. Additional useful solid state proton conductors, especially the cerates of strontium and barium, such as strontium ytterbiate cerate ($SrCe_{0.95}Yb_{0.05}O_{3-α}$) and barium neodymiate cerate ($BaCe_{0.9}Nd_{0.01}O_{3-α}$) are described in a final report, DOE/MC/24218-2957, Jewulski, Osif and Remick, prepared for the U.S. Department of Energy, Office of Fossil Energy, Morgantown Energy Technology Center by Institute of Gas Technology, Chicago, Ill., December, 1990.

Figure 1A:
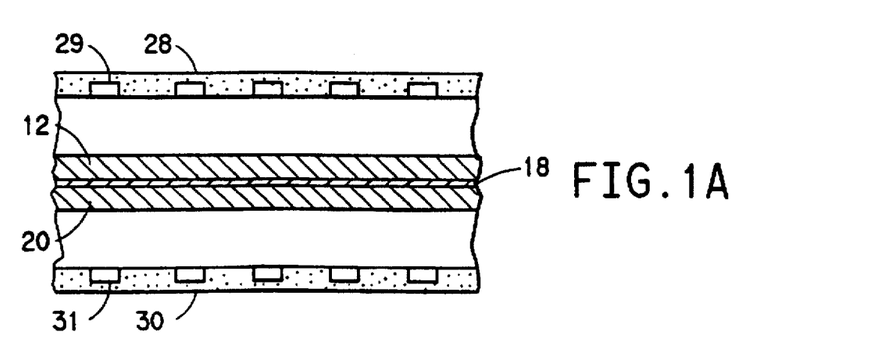
FIG. 1A is a cut away, top cross-sectional view of the anode and cathode mass flow fields as shown in FIG. 1.

The electrochemical cell of the first and second embodiments also comprises means for reducing the transported protons, where the reducing means is disposed in contact with the other side of the cation-transporting means. The reducing means comprises a cathode 20, where cathode 20 is disposed in contact with the other side (as opposed to the side which is in contact with the anode) of membrane 18 as illustrated in FIGS. 1 and 1A. Electrochemical cell 10 has a cathode-side inlet 24 and a cathode-side outlet 26 as shown in FIG. 1. Since in the preferred embodiment, anhydrous HF is processed, and since some fluorides may pass through the membrane and consequently, HF is present on the cathode-side of the cell, the cathode inlet and the outlet may be lined with PFA.

As known to one skilled in the art, if electrodes are placed on opposite faces of membrane, cationic charges (protons in the HCl reaction being described) are transported through the membrane from anode to cathode, while each electrode carries out a half-cell reaction. In the first and second embodiments, molecules of anhydrous hydrogen fluoride are transported to the surface of the anode through anode-side inlet 14. The molecules of the anhydrous hydrogen fluoride are oxidized to produce essentially dry fluorine gas and protons. The essentially dry fluorine gas exits through anode-side outlet 16 as shown in FIG. 1. The protons are transported through the membrane and reduced at the cathode. This is explained in more detail below.

The anode and the cathode may comprise porous, gas-diffusion electrodes. Such electrodes provide the advantage of high specific surface area, as known to one skilled in the art. The anode and the cathode comprise an electrochemically active material disposed adjacent, meaning at or under, the surface of the cation-transporting membrane. A thin film of the electrochemically active material may be applied directly to the membrane. Alternatively, the electrochemically active material may be hot-pressed to the membrane, as shown in A. J. Appleby and E. B. Yeager, Energy, Vol. 11, 137 (1986). Alternatively, the electrochemically active material may be deposited into the membrane, as shown in U.S. Pat. No. 4,959,132 to Fedkiw. The electrochemically active material may comprise any type of catalytic or metallic material or metallic oxide, as long as the material can support charge transfer. Preferably, the electrochemically active material may comprise a catalyst material such as platinum, ruthenium, osmium, rhenium, rhodium, iridium, palladium, gold, titanium or zirconium and the oxides, alloys or mixtures thereof. However, in general, the oxides of these materials are not used for the cathode. Other catalyst materials suitable for use with the present invention may include, but are not limited to, transition metal macro cycles in monomeric and polymeric forms and transition metal oxides, including perovskites and pyrochores.

In a hot-pressed electrode, the electrochemically active material may comprise a catalyst material on a support material. The support material may comprise particles of carbon and particles of polytetrafluoroethylene, or PTFE, a tetrafluoroethylene fluoropolymer resin which is sold under the trademark "TEFLON®" (hereinafter referred to as PTFE), commercially available from DuPont. The electrochemically active material may be bonded by virtue of the PTFE to a support structure of carbon paper or graphite cloth and hot-pressed to the cation-transporting membrane. The hydrophobic nature of PTFE does not allow a film of water to form at the anode. A water barrier in the electrode would hamper the diffusion of HCl to the reaction sites. The electrodes are preferably hot-pressed into the membrane in order to have good contact between the catalyst material and the membrane.

The loadings of electrochemically active material may vary based on the method of application to the membrane. Hot-pressed, gas-diffusion electrodes typically have loadings of 0.10 to 0.50 mg/cm$^2$. Lower loadings are possible with other available methods of deposition, such as distributing them as thin films from inks onto the membranes, as described in Wilson and Gottesfeld, "High Performance Catalyzed Membranes of Ultra-low Pt Loadings for Polymer Electrolyte Fuel Cells", Los Alamos National Laboratory, J. Electrochem. Soc., Vol. 139, No. 2 L28–30, 1992, where the inks contain solubilized NAFION® to enhance the catalyst-ionomer surface contact and to act as a binder to the NAFION® perfluorinated membrane sheet. With such a system, loadings as low as 0.017 mg active material per cm$^2$ have been achieved.

The electrochemical cell of the first and second embodiments further comprises mass flow field means. The mass flow field means comprises an anode mass flow field 28 disposed in contact with the anode, or a cathode mass flow field 30 disposed in contact with the cathode. The flow fields are electrically conductive, and act as both mass and current flow fields. Anode flow field 28 includes a plurality of anode flow channels 29, and cathode flow field 30 includes a plurality of cathode flow channels 31 as shown in FIG. 1A. The purpose of the anode flow field and channels 29 is to get reactants, such as anhydrous HF in the first and second embodiments, to the anode and products, such as essentially dry fluorine gas, from the anode. The purpose of the cathode flow field and channels 31 is to get reactants, such as liquid water in the first embodiment, or oxygen gas in the second embodiment, to the cathode and products, such as hydrogen gas in the first embodiment, or water vapor ($H_2O(g)$) in the second embodiment, from the cathode. Water vapor may be needed to keep the membrane hydrated. However, water vapor may not be necessary in this embodiment because of the water produced by the electrochemical reaction of the oxygen ($O_2$) added as discussed below.

In accordance with the present invention, at least one of the anode and the cathode mass flow fields comprises glassy, or vitreous carbon. Glassy carbon has a number of very desirable characteristics, especially compared to graphite. For instance, the gas permeability of glassy carbon is 10 to 12 orders of magnitude lower than the gas permeability of common forms of graphite, which is often used as a mass flow field. The density of glassy carbon is slightly less than some forms of graphite, and its apparent porosity is very low compared to graphite (1–3 compared to 20–30%). This low porosity has important consequences for other physical properties, such as gas permeability. The tight interlocking structure of glassy carbon results in low porosity, and this also results in a structure which is virtually not permeable to gases. This structure is absent in graphite, which permits significant passage of gas molecules through its structure.

General information with respect to vitreous carbon may be found in an article entitled "Vitreous Carbon—A New Form of Carbon" appearing at pages 507–512 of Vol. 2 of the *Journal of Material Science*. Glassy carbon is a commercially available material, and is sold by Tokai Carbon Co., Ltd.

Since it is difficult to produce a thick sheet of glassy carbon, it may be advantageous that entire mass flow field not be formed of glassy carbon, but rather be made of another material, such as graphite, which is coated with glassy carbon to lessen its gas permeability. Suitable methods for producing vitreous carbon coatings on graphite bodies are described in U.S. Pat. No. 3,8954,979.

The electrochemical cell of the first and second embodiments may also comprise an anode mass flow manifold 32 and a cathode mass flow field manifold 34 as shown in FIG. 1. The purpose of such manifolds is to bring products to and reactants from both the anode and the cathode, as well as to form a frame around the anode mass flow field and the anode, and the cathode mass flow field and the cathode, respectively. These manifolds are preferably made of a corrosion resistant material, such as PFA. A gasket 36, 38, also contributes to forming a frame around the respective anode and cathode mass flow fields. These gaskets are preferably also made of a corrosion resistant material, such as PTFE.

The electrochemical cell of the first and second embodiments also comprises an anode current bus 46 and a cathode current bus 48 as shown in FIG. 1. The current buses conduct current to and from a voltage source (not shown). Specifically, anode current bus 46 is connected to the positive terminal of a voltage source, and cathode current bus 48 is connected to the negative terminal of the voltage source, so that when voltage is supplied to the cell, current flows through all of the cell components to the right of current bus 46 as shown in FIG. 1, including current bus 48, from which it returns to the voltage source. The current buses are made of a conductor material, such as copper.

The electrochemical cell of the first and second embodiments of the present invention further comprises a current distributor disposed in contact with the flow field. An anode current distributor 40 is disposed in contact with anode flow field 28, and a cathode current distributor 42 is disposed in contact with cathode flow field 30. The anode current distributor collects current from the anode bus and distributes it to the anode by electronic conduction. The cathode current distributor collects current from the cathode and distributes it to the cathode bus by electronic conduction. The anode and the cathode current distributors preferably each comprise a non-porous layer. The anode current distributor thus provides a barrier between the anode and the current bus, as well as between the current bus and the hydrogen halide, such as hydrogen fluoride, the halogen gas, such as fluorine gas. The cathode current distributor provides a barrier between the cathode current bus and the and the cathode, as well as between the cathode current bus and the hydrogen halide. This is desirable because there is some migration of hydrogen halide through the membrane. The current distributors of the present invention may be made of a variety of materials, and the material used for the anode current distributor need not be the same as the material used for the cathode current distributor. In one instance, the anode current distributor is made of platinized tantalum, and the cathode current distributor is made of a nickel-based alloy, such as UNS10665, sold as HASTELLOY® B-2, by Haynes, International.

In the first and second embodiments, the electrochemical cell also comprises a conductive structural support 44 disposed in contact with anode current distributor 40. The support on the anode side is preferably made of UNS31603 (316L stainless steel). A seal 45, preferably in the form of an O-ring made from a perfluoroelastomer, sold in parts under the trademark KALREZ® by DuPont, is disposed between structural support 44 on the anode side and anode current distributor 40. It should be noted that while structural support 44 is shown in front of anode current bus 46 in FIG. 1, it is within the scope of the present invention for the structural support to be placed behind the anode current bus (i.e., to the left of bus 46 as shown in FIG. 1) and still achieve the same results. The cathode current distributor acts as a corrosion-resistant structural backer on the cathode side. This piece can be drilled and tapped to accept the TEFLON® PFA fitting, which is used for the inlet and outlet.

When more than one anode-cathode pair is used, such as in manufacturing, a bipolar arrangement, as familiar to one skilled in the art, is preferred. The electrochemical cell of the present invention may be used in a bipolar stack. To create such a bi-polar stack, current distributors 40 and 42 and all the elements disposed in between as shown in FIG. 1 are repeated along the length of the cell, and current buses are placed on the outside of the stack.

Further in accordance with the first and second embodiments of the present invention, there is provided a process for the direct production of essentially dry halogen gas from essentially anhydrous hydrogen halide. The anhydrous hydrogen halide may comprise hydrogen chloride, hydrogen bromide, hydrogen fluoride or hydrogen iodide. It should be noted that the production of bromine gas and iodine gas can be accomplished when the electrochemical cell is run at elevated temperatures (i.e., about 60° C. and above for bromine and about 190° C. and above for iodine). In the case of iodine, a membrane other than NAFION® should be used.

The operation of the electrochemical cell for a preferred version of the first embodiment, where hydrogen, as well as fluorine gas, is produced by the cell, will now be described as it relates to a preferred embodiment of the process of the present invention, where the anhydrous hydrogen halide is hydrogen fluoride. In operation, current flows to the anode bus, and anode current distributor 40 collects current from the anode bus and distributes it to the anode by electronic conduction. Molecules of essentially anhydrous hydrogen fluoride gas are fed to anode-side inlet 14 and through flow channels 29 in the anode mass flow field 28 and are transported to the surface of anode 12. The molecules are oxidized at the anode under the potential created by the voltage source to produce essentially dry fluorine gas ($F_2(g)$) at the anode, and protons ($H^+$). This reaction is given by the equation:

$$2HF(g) \xrightarrow{\text{Electrical Energy}} 2H^+ + F_2(g) + 2e^- \quad (1)$$

The fluorine gas ($F_2(g)$) exits through anode-side outlet 16 as shown in FIG. 1. The protons ($H^+$) are transported through the membrane, which acts as an electrolyte. The transported protons are reduced at the cathode. This reaction for the first embodiment is given by the equation:

$$2H^+ + 2e^- \xrightarrow{\text{Electrical Energy}} H_2(g) \quad (2)$$

Water is delivered to the cathode through cathode-side inlet 24 and through the grooves in cathode flow field 30 to hydrate the membrane and thereby increase the efficiency of proton transport through the membrane. In the first embodiment, the hydrogen which is evolved at the interface between the electrode and the membrane exits via cathode-side outlet 26 as shown in FIG. 1. The hydrogen bubbles through the water and is not affected by the PTFE in the electrode. Cathode current distributor 42 collects current from cathode 20 and distributes it to cathode bus 48.

The operation of the electrochemical cell according to the second embodiment will now be described as it relates to a preferred embodiment of the process of the present invention, where the anhydrous hydrogen halide is hydrogen fluoride. In operation, current flow to the anode bus, and anode current distributor 40 collects current from the anode bus and distributes it to the anode by electronic conduction. Molecules of essentially anhydrous hydrogen fluoride are fed to anode-side inlet 14 and are transported through grooves of anode mass flow field 28 to the surface of anode 12. An oxygen-containing gas, such as oxygen ($O_2(g)$, air or oxygen-enriched air (i.e., greater than 21 mol % oxygen in nitrogen) is introduced through cathode-side inlet 24 and through the grooves formed in cathode mass flow field 30. Although air is cheaper to use, cell performance is enhanced when enriched air or oxygen is used. This cathode feed gas may be humidified to aid in the control of moisture in the membrane. Molecules of the hydrogen fluoride (HF(g)) are oxidized under the potential created by the voltage source to produce essentially dry fluorine gas at the anode, and protons (H$^+$), as expressed in equation (1) above. The fluorine gas (F$_2$) exits through anode-side outlet 16 as shown in FIG. 1. The protons (H$^+$) are transported through the membrane, which acts as an electrolyte. Oxygen and the transported protons are reduced at the cathode to water, which is expressed by the equation:

$$\frac{1}{2} O_2(g) + 2e^- + 2H^+ \rightarrow H_2O(g) \qquad (3)$$

The water formed (H$_2$O(g) in equation (3)) exits via cathode-side outlet 26 as shown in FIG. 1, along with any nitrogen and unreacted oxygen. The water also helps to maintain hydration of the membrane, as will be further explained below. Cathode current distributor 42 collects current from cathode 20 and distributes it to cathode bus 48 by electronic conduction.

In this second embodiment, the cathode reaction is the formation of water. This cathode reaction has the advantage of more favorable thermodynamics relative to H$_2$ production at the cathode as in the first embodiment. This is because the overall reaction in this embodiment, which is expressed by the following equation:

$$2HF(g) + 1/2\, O_2(g) \xrightarrow{\text{Electrical Energy}} H_2O(g) + F_2(g) \qquad (4)$$

involves a smaller free-energy change than the free-energy change for the overall reaction in the first embodiment, which is expressed by the following equation:

$$2HF(g) \xrightarrow{\text{Electrical Energy}} H_2(g) + F_2(g) \qquad (5)$$

Thus, the amount of voltage or energy required as input to the cell is reduced in this second embodiment.

In the first and second embodiments, the cathode-side of the membrane must be kept hydrated in order to increase the efficiency of proton transport through the membrane. In the first embodiment, which has a hydrogen-producing cathode, the hydration of the membrane is obtained by keeping liquid water in contact with the cathode. The liquid water passes through the gas-diffusion electrode and contacts the membrane. In the second embodiment, which has a water-producing cathode, the membrane hydration is accomplished by the production of water as expressed by equation (3) above and by the water introduced in a humidified oxygen-feed or air-feed stream. This keeps the conductivity of the membrane high.

In either of the first or second embodiments, the electrochemical cell can be operated over a wide range of temperatures. Room temperature operation is an advantage, due to the ease of use of the cell. However, operation at elevated temperatures provides the advantages of improved kinetics and increased electrolyte conductivity. Higher temperatures result in lower cell voltages. However, limits on temperature occur because of the properties of the materials used for elements of the cell. For example, the properties of a NAFION® membrane change when the cell is operated above 120°0 C. The properties of a polymer electrolyte membrane make it difficult to operate a cell at temperatures above 150° C. With a membrane made of other materials, such as a ceramic material like beta-alumina, it is possible to operate a cell at temperatures above 200° C. It should be noted also that one is not restricted to operate the electrochemical cell of either the first or the second embodiment at atmospheric pressure. The cell could be run at differential pressure gradients, which change the transport characteristics of water or other components in the cell, including the membrane.

Figure 2:
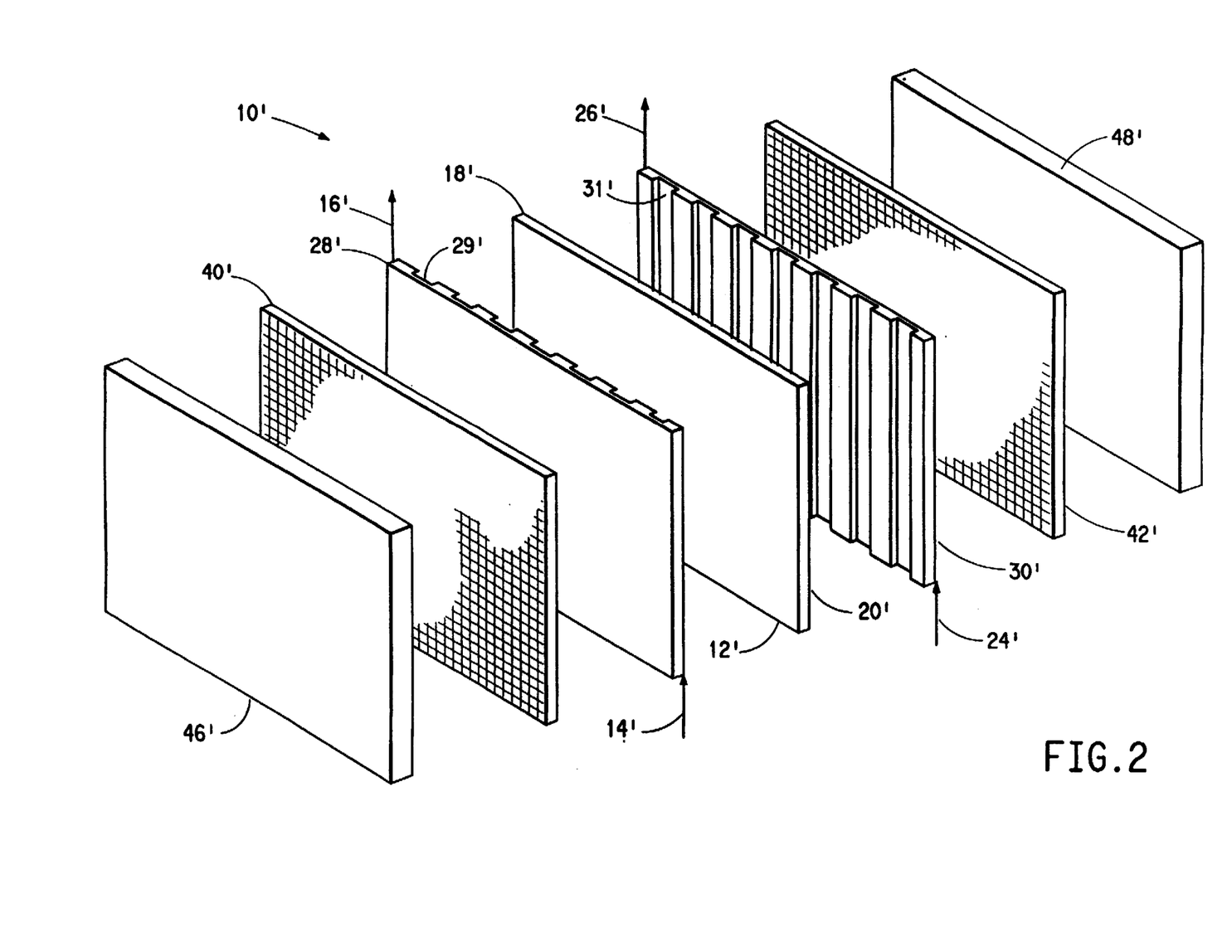
FIG. 2 is a perspective view of an electrochemical cell for producing halogen gas from aqueous hydrogen halide according to a third embodiment of the present invention.

FIG. 2 illustrates a third embodiment of the present invention. Wherever possible, elements corresponding to the elements of the embodiment of FIG. 1 will be shown with the same reference numeral as in FIG. 1, but will be designated with a prime ('). An electrochemical cell of the third embodiment is shown generally at 10' in FIG. 2. The electrochemical cell of the third embodiment will be described with respect to a preferred embodiment, where halogens, such as chlorine, are generated by the electrolysis of an aqueous solution of a hydrogen halide, such as hydrochloric acid. One could also use this cell for other uses, for instance, in a chlor-alkali system, with brine and hydrochloric acid. Alternatively, the cell of the third embodiment may be a fuel cell.

The electrochemical cell of the third embodiment comprises an electrode, or more specifically, an anode 12'. The electrochemical cell of the third embodiment also comprises a membrane disposed in contact with one side of the electrode. A membrane 18' is shown in FIG. 2 having one side disposed in contact with one side of anode 12'. Unlike the membrane in the first embodiment, the membrane need not necessarily be a cation-transporting membrane. The electrochemical cell of the third embodiment also comprises an electrode, or more specifically, a cathode 20', where cathode 20' is disposed in contact with the other side (as opposed to the side which is in contact with the anode) of membrane as illustrated in FIG. 2.

The electrochemical cell of the third embodiment further comprises a mass flow field disposed in contact with the electrode. The mass flow field may be an anode mass flow field 28' disposed in contact with the anode, or a cathode mass flow field 30' disposed in contact with the cathode. The mass flow fields act as both mass and current flow fields. The purpose of the anode flow field is to get reactants, such as aqueous HCl in the third embodiment to the anode and products, such as wet chlorine gas, from the anode. The purpose of the cathode flow field is to get catholyte to the cathode and product from the cathode. The mass flow fields of the third embodiment include flow channels 29' and 31' for performing these functions. In the third embodiment, the mass flow fields comprise glassy carbon as described above with respect to the first two embodiments.

The electrochemical cell of the third embodiment also comprises a current bus for conducting current to the electrode, where the current bus is disposed on the other side of the electrode. An anode current bus 46' and a cathode current bus 48' are shown in FIG. 2. The current buses conduct current from a voltage source (not shown). Specifically, anode current bus 46' is connected to the positive terminal of a voltage source, and cathode current bus 48' is connected to the negative terminal of the voltage source, so that when voltage is supplied to the cell, current flows from the voltage source through all of the elements to the right of current bus 46' as shown in FIG. 2, including current bus 48' from which it returns to the voltage source. As in the first two embodiments, the current buses of the third embodiment are made of a conductor material, such as copper.

The electrochemical cell of the third embodiment further comprises a current distributor disposed on one side of the electrode. An anode current distributor 40' is disposed on one side of anode 12', and a cathode current distributor 42' is disposed on one side of cathode 20'. As in the first two embodiments, the anode current distributor distributes current to the anode by electronic conduction and allows current to flow away from the anode. The cathode current distributor distributes current to the cathode by electronic conduction and allows current to flow to the cathode. The anode and the cathode current distributors preferably each comprise a non-porous layer. Moreover, as in the first two embodiments, the anode current distributor provides a barrier between the anode current bus and the anode, as well as between the anode current bus and the reactant, such as aqueous hydrogen chloride and the product, such as wet gaseous chlorine. The cathode current distributor provides a barrier between the cathode current bus and the cathode, as well as between the cathode current bus and the catholyte. The current distributors of third embodiment may be made of a variety of materials, and the material used for the anode current distributor need not be the same as the material used for the cathode current distributor.

As known to one skilled in the art, if electrodes are placed on opposite faces of membrane, cationic charges (protons in the HCl reaction being described) are transported through the membrane from anode to cathode, while each electrode carries out a half-cell reaction. In the third embodiment, hydrochloric acid, which is introduced at arrow 14', which indicates the anode-side inlet, is electrolyzed at anode 12' to produce gaseous chlorine, which exits at arrow 16', which represent the anode-side outlet, and hydrogen ions ($H^+$). The $H^+$ ions are transported across membrane 18', to cathode 20' along with some water and some hydrochloric acid. The hydrogen ions are discharged at the cathode through a cathode-side outlet 26'. A cathode-side inlet, which is optional, depending on the use of the cell, is shown at 24' in FIG. 2.

Additional advantages and modifications will readily occur to those skilled in the art. The invention, in its broader aspects, is, therefore, not limited to the specific details and representative apparatus shown and described. Accordingly, departures may be made from such details without departing from the spirit or scope of the general inventive concept as defined by the appended claims and their equivalents.

What is claimed is:

1. An electrochemical cell for directly producing essentially dry halogen gas from essentially anhydrous hydrogen halide, comprising:
   (a) means for oxidizing molecules of essentially anhydrous hydrogen halide to produce essentially dry halogen gas and protons;
   (b) cation-transporting means for transporting the protons therethrough, wherein one side of the oxidizing means is disposed in contact with one side of the cation-transporting means;
   (c) reducing means for reducing the transported protons, wherein the reducing means is disposed in contact with the other side of the cation-transporting means; and
   (d) a mass flow field disposed on at least one side of the cation-transporting means, wherein the mass flow field comprises glassy carbon.

2. The electrochemical cell of claim 1, wherein the oxidizing means is an anode, the reducing means is a cathode, and the cation-transporting means is a membrane.

3. The electrochemical cell of claim 2, wherein the mass flow field is an anode mass flow field disposed in contact with the anode and further comprising a cathode mass flow field disposed in contact with the cathode, wherein the anode and the cathode mass flow fields have flow channels formed therein and the flow channels of the anode mass flow field and the flow channels of the cathode mass flow field are parallel to each other.

4. The electrochemical cell of claim 3, further comprising a cathode-side inlet disposed in fluid communication with the flow channels of the cathode mass flow field for delivering a fluid to the cathode to hydrate the membrane.

5. The electrochemical cell of claim 4, wherein the flow channels of the anode mass flow field and of the cathode mass flow field are both vertical.

6. The electrochemical cell of claim 4, wherein the anode and the cathode each comprise an electrochemically active material.

7. The electrochemical cell of claim 6, wherein the anode and the cathode are gas diffusion electrodes.

8. The electrochemical cell of claim 7, wherein the catalyst loading of the electrochemically active material is in the range of 0.10 to 0.50 mg/cm$^2$.

9. The electrochemical cell of claim 6, wherein the electrochemically active material comprises one of the following: platinum, ruthenium, osmium, rhenium, rhodium, iridium, palladium, gold, titanium, and zirconium, and the oxides, alloys and mixtures thereof.

10. The electrochemical cell of claim 9, wherein the electrochemically active material is applied as a film from ink onto the membrane.

11. The electrochemical cell of claim 10, wherein the loading of the electrochemically active material is about at least about 0.017 mg/cm$^2$.

12. The electrochemical cell of claim 9, wherein the electrochemically active material of the anode is ruthenium oxide.

13. The electrochemical cell of claim 12, wherein the cation-transporting membrane is a proton-transporting membrane.

14. The electrochemical cell of claim 13, wherein the proton-transporting membrane comprises a copolymer of tetrafluoroethylene and poly-sulfonyl fluoride vinyl ether-containing pendant sulfonic acid groups.

15. The electrochemical cell of claim 14, wherein the anode mass flow field and the cathode mass flow field comprise graphite coated with glassy carbon.

16. The electrochemical cell of claim 12, wherein the electrochemically active material of the cathode is platinum.

17. The electrochemical cell of claim 9, wherein the electrochemically active material of the anode and the cathode is platinum.

18. The electrochemical cell of claim 6, wherein the electrochemically active material is bonded to a support structure.

19. The electrochemical cell of claim 18, wherein the support structure comprises carbon paper.

20. The electrochemical cell of claim 18, wherein the support structure comprises graphite cloth.

21. The electrochemical cell of claim 18, wherein the electrochemically active material comprises a catalyst material on a support material.

22. The electrochemical cell of claim 21, wherein the support material comprises particles of carbon and particles of polytetrafluoroethylene.

23. The electrochemical cell of claim 22, wherein the electrochemically active material is bonded by the particles of polytetrafluoroethylene to the support structure.

* * * * *

UNITED STATES PATENT AND TRADEMARK OFFICE
CERTIFICATE OF CORRECTION

PATENT NO. : 5,855,748
DATED : January 5, 1999
INVENTOR(S) : Law et al.

It is certified that error appears in the above-identified patent and that said Letters Patent is hereby corrected as shown below:

Column 3, line 59, in place of "either" should appear --ether--.

Column 4, lines 23-24, in place of "poly-sulfonyl fluoride vinyl ether-containing" should appear --perfluoro vinyl ether-containing--.

Column 5, line 49, in place of ""Teflon®"" should appear --Teflon®--.

Claim 11, line 2, delete "about".

Claim 14, lines 3-4, in place of "poly-sulfonyl fluoride vinyl ether-containing" should appear --perfluoro vinyl ether-containing--.

Signed and Sealed this

Twenty-eighth Day of September, 1999

Attest:

Q. TODD DICKINSON

*Attesting Officer*   *Acting Commissioner of Patents and Trademarks*